United States Patent [19]

Chane-Ching

[11] Patent Number: 5,344,588
[45] Date of Patent: Sep. 6, 1994

[54] CERIUM (IV) COMPOUND

[75] Inventor: Jean-Yves Chane-Ching, Paris, France

[73] Assignee: Rhone-Poulenc Specialites Chimiques, Courbevoie, France

[21] Appl. No.: 750,750

[22] Filed: Aug. 21, 1991

Related U.S. Application Data

[63] Continuation of Ser. No. 344,529, Apr. 28, 1989, abandoned, which is a continuation of Ser. No. 876,681, Jun. 20, 1986, abandoned.

[30] Foreign Application Priority Data

Jun. 20, 1985 [FR] France .................. 85 09374

[51] Int. Cl.$^5$ .................. B01D 13/00; C01F 17/00
[52] U.S. Cl. .................. 252/313.1; 423/263
[58] Field of Search .................. 252/363.1; 423/263

[56] References Cited

U.S. PATENT DOCUMENTS

| | | | |
|---|---|---|---|
| 2,364,613 | 12/1944 | Ballard et al. | 423/21.1 |
| 3,024,199 | 3/1962 | Pasfield | 252/313.1 |
| 3,148,151 | 9/1964 | Fitch et al. | 252/313.1 |
| 3,359,213 | 12/1967 | Clearfield | 252/313.1 |
| 3,442,817 | 5/1969 | Luebke | 252/313.1 |
| 3,645,910 | 2/1972 | Woodhead | 252/313.1 |
| 3,761,571 | 9/1973 | Woodhead | 423/263 |
| 4,211,667 | 7/1980 | Yamada et al. | 252/313.1 |
| 4,231,893 | 11/1980 | Woodhead | 252/313.1 |
| 4,244,835 | 1/1981 | Block | 252/313.1 |
| 4,356,106 | 10/1982 | Woodhead et al. | 252/313.1 |
| 4,576,921 | 3/1986 | Lane | 252/313.1 |
| 4,606,847 | 8/1986 | Woodhead | 252/313.1 |

FOREIGN PATENT DOCUMENTS 2075478 11/1981 United Kingdom .
2102780 2/1983 United Kingdom .

OTHER PUBLICATIONS

*Inorganic Chemistry*, vol. 7, No. 4, Apr. 1968, pp. 715–721, T. A. Beineke et al.

*Primary Examiner*—Edward A. Miller
*Attorney, Agent, or Firm*—Burns, Doane, Swecker & Mathis

[57] ABSTRACT

A novel cerium (IV) compound, well adopted for the production of aqueous colloidal sols therefrom, has the general formula (I):

$$Ce\,(Me)_x\,(OH)_y\,(NO_3)_z \qquad (I)$$

wherein M is an alkali metal an ammonium radical; x ranges from 0.01 to 0.2; y is a number such that $y = 4 - z + x$; and z ranges from 0.4 to 0.7.

32 Claims, 1 Drawing Sheet

CERIUM (IV) COMPOUND

This application is a continuation of application Ser. No. 07/344,529, filed Apr. 28, 1989, which is a continuation of application Ser. No. 06/876,681, filed Jun. 20, 1986 (both now abandoned).

BACKGROUND OF THE INVENTION

1. Field of the Invention

The present invention relates to a novel compound of cerium (IV) and to a process for the preparation thereof. This invention more especially relates to a novel compound of cerium (IV) that is readily dispersed in water.

2. Description of the Prior Art

It is known to this art, from the Kirk-Othmer *Encyclopedia of Chemical Technology*, 2nd Edition, Vol. 4, p. 850, that a hydrated ceric dioxide corresponding to the formula $CeO_2 \cdot x\, H_2O$, wherein x is a number ranging from 0.5 to 2 and which is present in the form of a gelatineous precipitate, may be prepared by the addition of sodium or ammonium hydroxide to solutions to ceric salts.

It has also been proposed to this art, according to French Patent No. 2,482,075, to prepare a compound of cerium (IV) which is dispersible in water by dispersing, in an aqueous medium, a hydrate of an essentially dry oxide of cerium (IV), the same having been subjected to a heat treatment at a temperature of from 200° C. to 450° C., in the presence of a disintegrating agent, in particular nitric acid. Heating in the presence of a disintegrating agent effects the disintegration of the aggregated crystallites into the hydrated cerium (IV) oxide, thereby producing a dispersible cerium compound.

It is noted in this '075 patent that the preparation of a hydrate of cerium (IV) oxide may be carried out by precipitation beginning with a cerium salt; thus, for example, a high purity cerous carbonate may be dissolved in a solution of nitric or hydrochloric acid to obtain a neutral solution of cerous nitrate or chloride, which is then oxidized with $NH_4OH/H_2O_2$ to obtain the hydrate of cerium (IV) oxide.

SUMMARY OF THE INVENTION

A major object of the present invention is the provision of a novel compound of cerium (IV) that is readily dispersible in water and which is obtained from an aqueous colloidal dispersion of cerium (IV) prepared directly from an aqueous solution of a cerium (IV) salt without the need for a precipitation stage and separation of the ceric hydroxide.

The novel cerium (IV) compound according to the invention is a basic salt of cerium (IV) and has the following general formula (I):

$$Ce\, (M)_x\, (OH)_y\, (NO_3)_z \qquad (I)$$

wherein M is an alkali metal or an ammonium radical; x ranges from 0.01 to 0.2; y is a number such that $y = 4 - z + x$; and z ranges from 0.4 to 0.7.

Differential thermal analysis evidences an exothermic peak of 250° C. to 300° C. during the calcination of the product in air utilizing a temperature rise of 300° C. per hour.

X-ray diffraction analysis evidences that the product of the invention is a poorly crystallized product comprising a crystalline phase of the $CeO_2$ type with a lattice parameter varying from 5.42 Å to 5.44 Å and a degree of crystallization ranging from 30 to 70%, advantageously from 40 to 60%. In the crystallized portion, the size of the crystallites is small and generally less than 60Å.

The present invention also features a process for the preparation of the novel compound (I) by first preparing an aqueous colloidal dispersion of a compound of cerium (IV) and thence subjecting it to a heat treatment.

DETAILED DESCRIPTION OF THE PREFERRED EMBODIMENTS OF THE INVENTION

Figure 1:
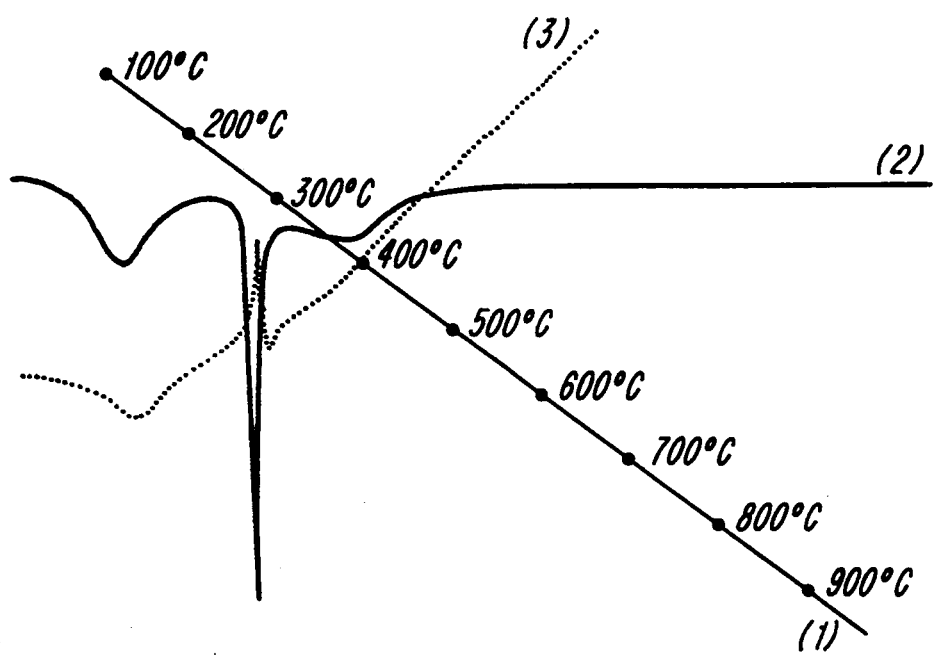
FIG. 1 depicts the differential thermal analysis of a product made according to the invention.

More particularly according to this invention, in the first stage of the subject process, a colloidal dispersion of a compound of cerium (IV) is prepared. In this dispersion, the cerium (IV) is present simultaneously in the form of both ions and colloids, which signifies that there are particles present having colloidal dimensions. In order to simplify the description of the invention, "colloidal dispersion" is defined as a mixture of ions and colloids more fully explained hereinbelow.

The preparation of said colloidal dispersion is carried out by reacting an aqueous solution of the salt of cerium (IV) with a base under those conditions described hereinafter.

The solution of the cerium salt used according to the process of the invention may be an aqueous solution of ceric nitrate or an aqueous solution of cerium-ammonium nitrate. The solution may contain, without disadvantage, cerium in the cerous state, but it is desirable that it contain at least 85% of cerium (IV).

The solution of the cerium salt is selected such that it will not contain impurities which could be transferred into the final product. In particular, it is preferable that it does not contain covalent anions which are coagulating in nature, such a sulfates, and the like. However, small amounts may be tolerated. For example, said anions may constitute up to 5% by weight of the cerium salt, expressed as $CeO_2$.

The concentration of the solution of the cerium salt is not critical according to this invention. If it is expressed in terms of cerium (IV) values, it may advantageously vary from 0.1 to 2 moles per liter. It may be important for reasons of productivity to use a concentrated solution of the cerium (IV) salt; a concentration of from 1 to 2 moles per liter is preferred.

The aqueous solution of the cerium (IV) salt generally has a certain initial acidity and may have a normality ranging from 0.1 N to 4 N. The concentration in $H^+$ ions is not critical. It is desirable that it range from 0.1 N to 1 N.

The solution of ceric nitrate obtained according to the electrolytic oxidation of a solution of cerous nitrate and described in published French Application No. 2,570,087 (No. 84/13641) is one starting material of choice.

The basic solution used according to the invention may be, in particular, an aqueous solution of ammonium, sodium or potassium hydroxide. Gaseous ammonia may also be used. Consistent herewith, an ammonium solution is the preferred.

The normality of the basic solution is not critical according to the invention; it may vary over a wide range, for example, from 0.1 to 11 N, but preferably solutions having concentrations varying from 0.1 to 5 N are used.

The proportion between the basic solution and the solution of the cerium (IV) salt must be such that the neutralization ratio be greater than or equal to 0.01 and less than or equal to 3.0.

The neutralization ratio E is defined by the equation:

$$r = \frac{n3 - n2}{n1}$$

wherein n1 represents the number of moles of Ce (IV) present in the final colloidal dispersion; n2 represents the number of moles of $OH^-$ necessary to neutralize the acidity introduced by the aqueous solution of the cerium (IV) salt; and n3 represents the total number of moles of $OH^-$ introduced by the addition of the base.

The neutralization ratio reflects the colloidal state of cerium (IV):
 with r=4, the cerium (IV) precipitates in a gelatinous form,
 with r=0, the cerium (IV) precipitates in the ionic form,
 with 0<r<4, the cerium (IV) is in the ionic and/or colloidal form.

In order to improve the yield of the process to obtain the cerium (IV) compound having the formula (I), for final cerium (IV) concentrations of less than 0.5 mole/liter, a neutralization ratio of greater than or equal to 0.01 and less than or equal to 2.5, are selected. In contrast, for concentrations greater than 0.5 mole/liter, ratios greater than or equal to 0.01 and less than or equal to 2, are selected.

In a practical manner, to obtain the desired neutralization ratio E selected within the aforementioned range for a given Ce (IV) concentration in the final colloidal dispersion, the concentration of the basic solution is adjusted in a manner such that it satisfies the following equation:

$$[OH^-] = \frac{(n_1 \cdot r + n_2)\,[Ce(IV)]_f[Ce(IV)]_i}{n_1([Ce(IV)]_i - [Ce(IV)]_f)}$$

wherein:
 $[OH^-]$ represents the concentration in moles/liter of the basic solution,
 $[Ce(IV)]_f$ represents the concentration in Ce (IV) in moles/liter of the final colloidal dispersion,
 $[Ce(IV)]_i$ represents the concentration in Ce (IV) in moles/liter of the aqueous solution of the cerium (IV) salt,
 $n_1$ and $n_2$ are determined by the conventional analysis of the aqueous solution of the cerium (IV) salt:
 $n_1$ by potentiometric titration with the aid of a ferrous salt,
 $n_2$ by acid-base titration following the complexing of cerium with the aid of oxalate ions.

The reaction between the aqueous solution of the cerium (IV) salt and the base, in predetermined amounts thereof, is carried out at a temperature of from 0° C. to 60° C., but preferably at ambient temperature, most typically from 15° C. to 25° C.

The mixture of the aforementioned reagents may be carried out according to anyone of a number of different embodiments. For example, admixture of the aqueous solution of the cerium (IV) salt with the basic solution may be carried out simultaneously under agitation, or the base may be added continuously, or in a single batch, to the aqueous solution of the cerium (IV) salt, or vice versa.

The duration of the mixing depends upon the capacity of the equipment. It may vary from 0.1 second to 30 hours and is preferably selected from 2 hours to 6 hours.

Regardless of the order of the introduction of the reagents, a colloidal dispersion of a cerium (IV) compound in an aqueous medium is obtained.

The dispersion prepared in this manner and used in the process of the invention has a cerium (IV) concentration ranging from 0.1 to 2 moles/liter and preferably from 0.3 to 0.8 mole/liter.

It should be noted that the lower limit is not critical, but in view of the productivity of the equipment it is desirable that this concentration be higher than 0.3 mole/liter.

The proportion of cerium (IV) in the colloidal form, determined for example by chemical analysis of the supernatant liquid obtained after ultracentrifugation, ranges from 20 to 70% of the cerium (IV) introduced.

The size of the colloids is defined as the measurement of the hydrodynamic diameter of the colloids determined by the quasi-elastic diffusion of light by the method described by Micheal L. McConnell in *Analytical Chemistry*, 53, No. 8, 1007 A (1981); this diameter may vary from 40 to 300 Å.

In a second stage, the aqueous colloidal dispersion of the cerium (IV) compound is heat treated at a temperature of from 80° C. to 300° C., preferably from 90° C. to 110° C. It is preferred to operate at the reflux temperature of the reaction mixture, as it is easier to control and reproduce this temperature.

The aqueous dispersion of the cerium (IV) compound may be directly exposed to the selected temperature, or the temperature may be gradually increased thereto.

The conditions of the heat treatment are not critical; it may be carried out under atmospheric pressure or under a pressure such as, for example, the vapor pressure of saturation at the temperature of the heat treatment. The treatment may be carried out in air or under an inert atmosphere, preferably nitrogen.

It is not necessary to agitate the mixture during the heat treatment.

The duration of the treatment may vary over a wide range of from 2 to 48 hours, preferably from 2 to 24 hours.

Upon completion of this operation, a solid precipitate is recovered, which is separated by conventional separation methods: filtration, sedimentation, drainage and centrifugation, or the like.

The product obtained is dried at a temperature of from 15° C. to 120° C. and preferably at ambient temperature (15° C. to 25° C.). This operation may be carried out in air or under a reduced pressure, for example, from 1 to 100 mm of mercury (133.3322 Pa to 13,332.2 Pa).

According to the invention, the cerium (IV) compound is prepared in a yield by weight, expressed as $CeO_2$, with respect to the solution of the cerium (IV) salt introduced, of up to 99%.

The compound of the invention prepared by the process described above is capable of easily forming an aqueous dispersion of the cerium (IV) compound, hereinafter referred to as the "sol".

Thus, the present invention also features the aqueous sol formulated from the cerium (IV) compound having the formula (I).

The present invention also provides a process for the preparation of an aqueous sol of the cerium (IV), whereby the cerium (IV) compound of the formula (I) is placed in suspension in water.

The compound may be dispersed in an aqueous medium, or in a slightly acid medium, such that the resulting sol has a pH of from 1 to 2.5.

The nature of the water is not critical and its temperature is generally ambient temperature.

The sol is preferably prepared under agitation.

In the product sol, the cerium (IV) compound is essentially in the form of a colloidal dispersion in water, but this does not exclude the presence of Ce (IV) in the ionic form, in place of the cerium (IV) compound dispersed in the colloidal form.

The proportion of cerium (IV) in the colloidal form is generally higher than 95% and preferably ranges from 99 to 100%.

According to the invention, an aqueous sol of the cerium (IV) compound may be prepared in a concentration, expressed as $CeO_2$, of up to 2 moles per liter.

A sol, the size of the colloids of which varies over a rather wide range, may be obtained. Generally, the hydrodynamic diameter of the colloids, determined by quasi-elastic light diffusion, ranges from 40 to 600 Å.

The size of the colloids comprising the sol may be controlled by varying the cerium concentration and the degree of neutralization of the colloidal dispersion. For a given and constant cerium concentration, the size of the colloids becomes smaller with an increasing degree of neutralization.

The sols obtained according to the invention are stable in storage; there is no settling after several months in storage.

They have a pH of about 1 and remain stable upon basification up to a pH of approximately 2.5.

In this case, the size of the colloids is larger; the hydrodynamic diameter of the colloids may vary from 150 to 3000 Å.

Accordingly, this invention also features novel aqueous sols of the cerium (IV) compound, one characteristic of which is the fineness of their colloid size, the hydrodynamic diameter of which ranges from 40 to 100 Å.

The aforementioned sols are prepared via the process of preparation described above, but by subjecting a colloidal dispersion of a well-defined cerium (IV) compound to a heat treatment.

The starting material is a colloidal dispersion of a cerium (IV) compound having a cerium (IV) concentration of from 0.3 to 2 moles/liter end obtained by reacting an aqueous solution of a cerium (IV) salt with a base reactant such as to provide a neutralization ratio greater than or equal to 1 and less than or equal to 3.

In order to improve the yield in obtaining the cerium (IV) compound having the formula (I), the preferred concentration in cerium (IV) varies from 0.3 to 0.8 mole/liter and the neutralization ratio is selected to be higher than or equal to 1 and less than or equal to 2. The dispersion obtained in this manner is a mixture of ions and colloids, the colloidal size of which, as expressed by the hydrodynamic diameter, varies from 40 to 100 Å.

The heat treatment of the dispersion and the dispersion of the product obtained are carried out according to the method described above.

A sol containing a proportion of cerium (IV) in the colloidal form greater than 99% is obtained and the hydrodynamic diameter of the colloids thereof varies from 40 to 100 Å.

The size distribution of the colloids is uniform; as the size of the colloids is correlated with the measure of the diffusion coefficient of the translation of the particles, the uniformity of the distribution is determined by measuring the variance defined by the relationship:

$$\frac{(D_T - \overline{D_T})^2}{(\overline{D_T})^2}$$

wherein $D_T$ represents the diffusion coefficient of translation, which is an experimental value that may be determined by means of the quasi-elastic diffusion of light. It is found that the variance is generally less than 0.2 and often around 0.05.

By basifying until a pH of 2.5 is obtained, it is also possible to produce coarser colloids with a hydrodynamic diameter of from 150 to 500 Å.

In order to further illustrate the present invention and the advantages thereof, the following specific examples are given, it being understood that same are intended only as illustrative and in nowise limitative. In said examples to follow, all parts and percentages are by weight.

EXAMPLE 1

(a) Preparation of a cerium (IV) compound having the formula (I)

Into a 6 liter, three-necked flask equipped with a thermometer, an agitator, and a system for the introduction of reagents (metering pump), 376.5 cm$^3$ of a solution of ceric nitrate containing 1.37 moles/liter of cerium (IV), 0.02 mole/liter cerium (III) and having a free acidity of 0.385 N (obtained by electrolysis according to French Application No. 2,570,087) were introduced, at ambient temperature.

Into this solution, which was maintained under agitation, 1123 cm$^3$ of an 0.8 N ammonium solution were added at ambient temperature, at a rate of 100 cm3/hr.

An aqueous colloidal dispersion of a cerium (IV) compound was obtained having a concentration, expressed as $CeO_2$, of 60 g/l and a neutralization ratio of r=1.5.

The percentage of cerium in the colloidal form was apparently 40 to 60%; it was determined by analyzing the cerium (IV) in the supernatant solution obtained after ultra-centrifugation (140,000 g-2 hr) by potentiometric titration with the aid of an Fe (II) titer solution.

The size of the colloids was determined by the quasi-elastic diffusion of light according to the method described by Michael L. McConnell in *Analytical Chemistry*, Vol. 53, No. 8,1007 A (1981). The average hydrodynamic diameter of the colloids was on the order of 64 Å.

In a second stage, the aqueous colloidal dispersion of the cerium (IV) compound was subjected to a heat treatment. For the purpose, one liter of an aqueous dispersion freshly prepared by the aforedescribed method was placed into an oven heated to a temperature of 100° C.

After 24 hours, a yellow precipitate was recovered by filtration through sintered glass (No. 3 porosity).

The resultant product was then dried in air at ambient temperature until a constant weight was obtained.

54 g of a yellow precipitate having an ignition weight loss of approximately 22 to 23% were obtained.

X-ray diffraction analysis evidenced that the product of the invention was a poorly crystallized material having a crystalline phase of the $CeO_2$ type (this was a fluorine type, i.e., face-centered cubic structure). A lattice parameter of 5.42 Å and a crystalline proportion of approximately 45% were determined.

As the lattice parameter of pure $CeO_2$ is 5,411 Å(JCPDS 4 0593), it is noted that the lattice parameter had been slightly expanded.

Furthermore, if the product of the invention was exposed to a heat treatment by a gradual increase in temperature to 1000° C., only a weak evolution of its proportion of crystallization, as determined by x-ray diffraction and on the order of 10 to 20%, was observed, which demonstrated the poor ability of the product to crystallize.

(b) Preparation of an aqueous sol of the cerium (IV) compound of the invention 45.3 g of the compound prepared in step (a) were added to distilled water, which was used in an amount sufficient to provide a volume of 200 cm³.

A sol having a clear appearance was obtained; it had a Ce (IV) concentration, expressed as $CeO_2$, of 172 g/l (1 M) and a pH of about 1.

Examination by light diffusion evidenced the presence of colloids having a hydrodynamic diameter on the order of 47 Å in a uniform size distribution (variance=0.05).

It is noted that the sol obtained was stable in storage and exhibits no sedimentation for a duration of at least one year.

It was found that the sol was stable if the pH was increased. By the gradual addition of the above sol to an 0.1 N ammoniacal solution at a rate of 24 cm3/hr, it was possible to obtain a sol having a higher pH value, up to 2.5.

In this case, the hydrodynamic diameter of the colloids determined by the quasi-elastic diffusion of light was on the order of 153 Å (variance=0.09).

EXAMPLE 2

(a) The procedure of Example 1 was repeated, but with the following differences:
  (i) 1500 cm³ of a 2.8 N ammoniacal solution were used; and
  (ii) 1920 cm³ of a ceric nitrate solution were used, containing 1.24 moles/liter of cerium (IV) and having a free acidity of 0,332 N.

An aqueous colloidal dispersion of the cerium (IV) compound was obtained, having a cerium (IV) concentration, expressed as $CeO_2$, equal to 120 g/l and a neutralization ratio of r=1.5.

The size of the colloids was determined by the method described in Example 1; the average hydrodynamic diameter of the colloids was 69 Å.

In a second stage, the dispersion obtained was subjected to a heat treatment in an oven at 100° C. for 24 hours.

After drying in air, 344 g of a yellow product were recovered.

Chemical analysis of the resultant product showed the following chemical composition:
  (i) Ignition weight loss=24%
  (ii) $CeO_2$=76%
  (iii) $H_2O$=7%
  (iv) Molar ratio Ce (III)/Ce (III) +Ce (IV)=0. 04%
  (v) Molar ratio $NO_3^-$/Ce (IV)=0.6
  (vi) Molar ratio $NH_4^+$/Ce (IV)=0.1

Differential thermal analysis of this product is shown in the Figure of Drawing, with three curves being represented:
  The straight line (1) indicates the rise in temperature from 100° C. to 900° C. at a rate of 300° C. per hour;
  The curve (2) indicates the temperatures corresponding to the weight loss maxima;
  The curve (3) shows the exo- and endothermic effects during the rise in temperature.

An exothermic peak was noted around 250°–300° C.

(b) A sol was prepared as in Example 1 by the addition of 45.3 g of the compound prepared in step (a) to distilled water, in an amount sufficient to provide a volume of 200 cm³.

A sol having a cerium (IV) concentration, expressed as $CeO_2$, of 172 g/l was obtained.

Examination by light diffusion showed the presence of colloids having a hydrodynamic diameter of approximately 59 Å and a homogeneous size distribution (variance=0.04).

EXAMPLE 3

(a) The procedure of Example 1 was again repeated, but with the following differences:
  (i) 6126 cm³ of an 0.65 N ammoniacal solution were used; and
  (ii) 1400 cm³ of aceric nitrate solution were used, containing 1.25 moles/liter of cerium (IV), 0.02 mole/liter (III) and having a free acidity of 0.345 N.

An aqueous colloidal dispersion of a cerium (IV) compound in a concentration, expressed as $CeO_2$, of 40 g/l and having a neutralization ratio of approximately 2 was obtained.

In a second stage, this dispersion was subjected to a heat treatment of 100° C. for 8 hours.

The precipitate formed was recovered by filtration. By determining the cerium content of the filtrate, the yield of the recovery of cerium (IV) in the form of a dispersible cerium (IV) compound was evaluated at 92%.

The product was dried at ambient temperature.

(b) By the simple addition of distilled water, a sol containing 40 g/l $CeO_2$ was obtained.

Examination by light diffusion of the sol obtained in this manner showed the presence of colloids having a hydrodynamic diameter of approximately 150 Å.

EXAMPLE 4

(a) The procedure of Example 1 was again repeated, but with the following differences:
  (i) 1000 cm³ of a ceric nitrate solution were used, containing 1.24 moles/liter of cerium (IV) and having a free acidity of 0,332 N; and
  (ii) 2555 cm³ of an 0.3726 N ammoniacal solution were used.

The addition of the ammonium solution at ambient temperature to the ceric nitrate solution was carried out at a rate of 1664 cm3/hr.

An aqueous colloidal dispersion of a cerium (IV) compound was obtained in a concentration, expressed as $CeO_2$, of 60 g/l and having a neutralization ratio of r=0.5.

In a second stage, the dispersion obtained was subjected to a heat treatment in a double wall reactor equipped with a condenser and an agitator system, at 100° C. for 4 hours.

After filtration of the precipitate and drying in an oven at 45° C., 264 g of a yellow product were recovered.

Chemical analysis of this product showed the following chemical composition:

(i) Ignition weight loss=21.79%
(ii) $CeO_2$=78.21%
(iii) Molar ratio $NO_3^-/Ce$ (IV)=0.49
(iv) Molar ratio $NH_4^+/Ce$ (IV)=0.025

(b) A sol was prepared, as in Example 1, by the addition of 44 g of the compound prepared according to step (a) to distilled water, in an amount sufficient to provide a volume of 200 cm³.

A sol having a cerium (IV) concentration, expressed as $CeO_2$, of 172 g/l was obtained.

Examination by the diffusion of light showed the presence of colloids having a hydrodynamic diameter of approximately 500 Å and a variance of 0.3.

EXAMPLE 5

(a) The procedure of Example 1 was again repeated, but with the following differences:

(i) 1000 cm³ of a solution of ceric nitrate were used, containing 1.24 moles/liter of cerium (IV) and having a free acidity of 0,332 N; and
(ii) 2555 cm³ of an 0.6153 N ammoniacal solution were used.

The addition of the ammonium solution at ambient temperature to the ceric nitrate solution was carried out over 2 hours, 32 min.

An aqueous colloidal dispersion of a cerium (IV) compound in a concentration, expressed as $CeO_2$, of 60 g/l and having a neutralization ratio of r=1.0, was obtained.

In a second stage, the dispersion obtained was subjected to a heat treatment, as in Example 4, at 100° C. for 4 hours.

After filtration of the resulting precipitate and drying in an oven at 45° C., 208 g of a yellow product were recovered.

Chemical analysis of this product showed the following chemical composition:

(i) Ignition weight loss=20.2%
(ii) $CeO_2$=79.8%
(iii) Molar ratio $NO_3^-/Ce$ (IV)=0.466
(iv) Molar ratio $NH_4^+/Ce$ (IV)=0.023

(b) A sol was prepared, as in Example 1, by the addition of 43.1 g of the compound prepared according to step (a) to distilled water, in an amount sufficient to provide a volume of 200 cm³.

A sol having a cerium (IV) concentration, expressed as $CeO_2$, of 172 g/l was obtained.

Examination by light diffusion showed the presence of colloids having a hydrodynamic diameter of approximately 177 Å with a variance of 0.5.

EXAMPLE 6

(a) The procedure of Example 1 was again repeated, but with the following differences:

(i) 1000 cm³ of aceric nitrate solution were used, containing 1.24 moles/liter of cerium (IV) and having a free acidity of 0.332 N; and
(ii) 4331 cm³ of an 0,363 N ammoniacal solution were used.

The addition of the ammonia solution at ambient temperature to the ceric nitrate solution was carried out over 2 hours, 32 min.

An aqueous colloidal dispersion of a cerium (IV) compound in a concentration, expressed as $CeO_2$, of 40 g/l and having a neutralization ratio of r=1.0 was obtained.

In a second stage, the dispersion obtained was subjected to a heat treatment, as in Example 4, at 100° C. for 4 hours.

After filtering the precipitate and drying in an oven at 45° C., 222 g of a yellow product were recovered.

Chemical analysis of this product showed the following chemical composition:

(i) Ignition weight loss=18.37%
(ii) $CeO_2$=81.63%
(iii) Molar ratio $NO_3^-/Ce$ (IV)=0.432

(b) A sol was prepared as in Example 1, by the addition of 42.14 g of the compound prepared according to step (a) to distilled water, in an amount sufficient to provide a volume of 200 cm³.

A sol having a cerium (IV) concentration, expressed as $CeO_2$, of 172 g/l was obtained.

Examination by light diffusion showed the presence of colloids having a hydrodynamic diameter of approximately 542 Å and a variance of 0.25.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aqueously dispersible cerium (IV) material having the general formula (I):

$$Ce\,(M)_x\,(OH)_y\,(NO_3)_z \qquad (I)$$

wherein M is an alkali metal or an ammonium radical; x ranges from 0.01 to 0.2; y is a number such that y=4−z+x; and z ranges from 0.4 to 0.7.

2. The cerium (IV) material as defined by claim 1, exhibiting an exothermic peak of 250° C. to 300° C. by differential thermal analysis at a temperature rise of 300° C. per hour.

3. The cerium (IV) material as defined by claim 1, comprising a $CeO_2$ type crystalline phase with lattice parameters of 5.42 Å to 5.44 Å and having a degree of crystallinity ranging from 30 to 70%.

4. The cerium (IV) material as defined by claim 3, having a degree of crystallinity ranging from 40 to 60%.

5. The cerium (IV) material as defined by claim 3, the size of the crystallites thereof being less than about 60 Å.

6. An aqueous colloidal dispersion of cerium (IV) material comprising an aqueously dispersible cerium (IV) material having the general formula (I):

$$Ce\,(M)_x\,(OH)_y\,(NO_3)_z \qquad (I)$$

wherein M is an alkali metal or an ammonium radical; x ranges from 0.01 to 0.2; y is a number such that y=4−z+x; and z ranges from 0.4 to 0.7.

7. An aqueous colloidal dispersion containing a cerium (IV) precipitate material produced by (I) reacting an aqueous solution of a cerium (IV) salt with a base reactant to form a colloidal dispersion of a cerium (IV) material in water, said colloidal dispersion having a neutralization ratio ranging from at least 0.01 to not more than 3, and (II) heat treating said colloidal dispersion to precipitate the cerium (IV) material therefrom, wherein said cerium (IV) salt is added in an amount sufficient to create a cerium (IV) concentration of from 0.01 to 2 moles/liter.

8. An aqueous colloidal dispersion as defined by claim 7, having a cerium (IV) concentration of from 0.3 to 0.8 mole/liter.

9. An aqueous colloidal dispersion as defined by claim 7, the hydrodynamic diameter of the colloidal particulates of which ranging from 40 to 300 Å.

10. An aqueous colloidal dispersion as defined by claim 7, from 20 to 70% of the cerium (IV) content of which comprising colloidal particulates.

11. A sol comprising a suspension, in water, of colloidal particulates of the cerium (IV) material as defined by claim 1.

12. The aqueous sol as defined by claim 11, the hydrodynamic diameter of the colloidal particulates of which ranging from 40 to 3000 Å.

13. The aqueous sol as defined by claim 12, the hydrodynamic diameter of the colloidal particulates of which ranging from 40 to 600 Å.

14. The aqueous sol as defined by claim 12, the hydrodynamic diameter of the colloidal particulates of which ranging from 150 to 3000 Å.

15. The aqueous sol as defined by claim 12, the hydrodynamic diameter of the colloidal particulates of which ranging from 40 to 100 Å.

16. The aqueous sol as defined by claim 12, the hydrodynamic diameter of the colloidal particulates of which ranging from 150 to 500 Å.

17. The aqueous sol as defined by claim 12, wherein the concentration of the cerium (IV) material therein, expressed as $CeO_2$, is up to 2 moles/liter.

18. The aqueous sol as defined by claim 12, having a pH ranging from about 1 to 2.5.

19. The aqueous sol as defined by claim 18, having a pH of about 1.

20. The aqueous sol as defined by claim 12, at least 95% of the cerium (IV) content of which comprising colloidal particulates.

21. The aqueous sol as defined by claim 20, at least 99% of the cerium (IV) content of which comprising colloidal particulates.

22. The aqueous sol as defined by claim 12, the size distribution of said colloidal particulates being essentially uniform.

23. An aqueous colloidal dispersion of the cerium (IV) material as defined by claim 6, wherein at least 95% of the cerium (IV) content in the dispersion is in the form of colloidal particulates.

24. An aqueous colloidal dispersion of the cerium (IV) material as defined by claim 6, wherein the concentration of the cerium (IV) material, expressed as $CeO_2$, is not more than 2 moles per liter.

25. An aqueous colloidal dispersion of a cerium (IV) material combined with a base, said cerium (IV) material having the general formula (I):

$$Ce\,(M)_x\,(OH)_y\,(NO_3)_z \qquad (I)$$

wherein M is an alkali metal or an ammonium radical; x ranges from 0.01 to 0.2; y is the number such that $y = 4 - z + x$; and z ranges from 0.4 to 0.7, said base being present in an amount such that, the colloidal particulates have a hydrodynamic diameter ranging from 150 to 3000 Å.

26. An aqueous colloidal dispersion according to claim 25, said base being present in an amount such that the pH is about 2.5.

27. An aqueous colloidal dispersion according to claim 6, including colloid particulates having a hydrodynamic diameter ranging from 40 to 100 Å.

28. An aqueous colloidal dispersion according to claim 27 having a uniform size distribution of colloids.

29. An aqueous colloidal dispersion according to claim 27, wherein at least 99% of the cerium (IV) content in the dispersion is in the form of colloidal particulates.

30. An aqueous colloidal dispersion according to claim 25, including colloid particulates having a hydrodynamic diameter ranging from 150 to 400 Å.

31. A cerium (IV) precipitate material produced by (i) reacting an aqueous solution of a cerium (IV) salt with a base reactant to form a colloidal dispersion of a cerium (IV) material in water, said colloidal dispersion having a neutralization ratio ranging from at least 0.01 to not more than 3, and (ii) heat treating said colloidal dispersion to precipitate a cerium (IV) material therefrom.

32. A cerium (IV) precipitate material according to claim 31 wherein said heat treatment is conducted at a temperature ranging from about 80° C. to about 300° C.

* * * * *